United States Patent [19]
Lau

[11] Patent Number: 6,147,881
[45] Date of Patent: Nov. 14, 2000

[54] RESONANT SWITCHING POWER SUPPLY

[75] Inventor: Chi-Sang Lau, Shi-Je, Taiwan

[73] Assignee: Hua-in Co., Ltd., Shi-Je, Taiwan

[21] Appl. No.: 09/408,722

[22] Filed: Sep. 29, 1999

[51] Int. Cl.[7] .......................... H02M 3/335; H02M 3/24; H02M 7/538
[52] U.S. Cl. ................. 363/17; 363/97; 363/134
[58] Field of Search .................. 363/17, 24, 25, 363/41, 95, 97, 132, 133, 134

[56] References Cited

U.S. PATENT DOCUMENTS

| | | | |
|---|---|---|---|
| 5,327,337 | 7/1994 | Cripe | 363/134 |
| 5,349,514 | 9/1994 | Ushiki et al. | 363/21 |
| 5,598,324 | 1/1997 | Inamura et al. | 363/21 |
| 5,646,835 | 7/1997 | Katcha | 363/98 |
| 5,768,112 | 6/1998 | Barrett | 363/17 |
| 5,774,346 | 6/1998 | Poon et al. | 363/17 |
| 5,777,859 | 7/1998 | Raets | 363/24 |
| 5,808,879 | 9/1998 | Liu et al. | 363/17 |
| 5,886,884 | 3/1999 | Back et al. | 363/48 |

*Primary Examiner*—Peter S. Wong
*Assistant Examiner*—Bao Q. Vu
*Attorney, Agent, or Firm*—Thomas M. Freiburger

[57] ABSTRACT

A resonant switching power supply has a zero voltage and zero current switch feature which can be operated in a half-bridge or a full-bridge scheme. This enables power consumption to be reduced and electromagnetic radiation to be minimized, and provides for low cost and convenient manufacture, in mass production. The power supply is not influenced by parasitic capacitance and leak inductance. The resonant switching power supply is disclosed in several different embodiments.

16 Claims, 10 Drawing Sheets

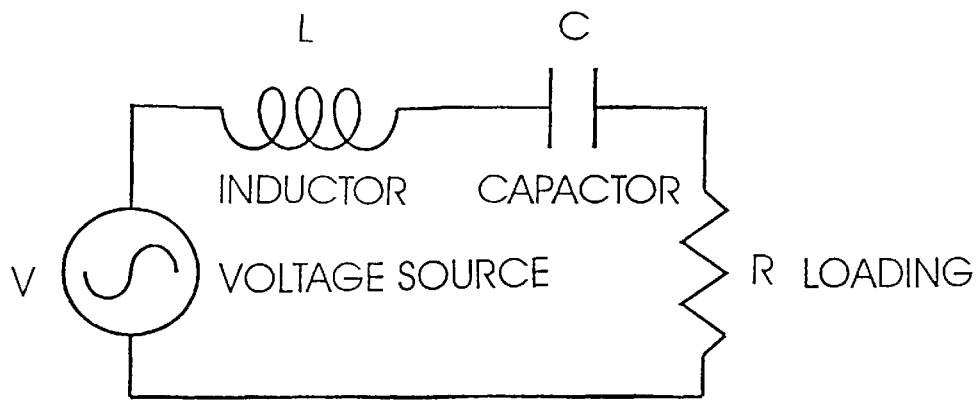
Fig. 1 PRIOR ART
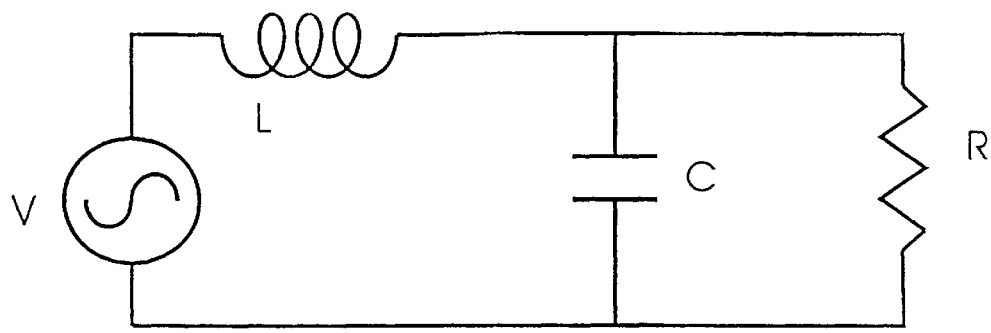
Fig. 2 (a) PRIOR ART
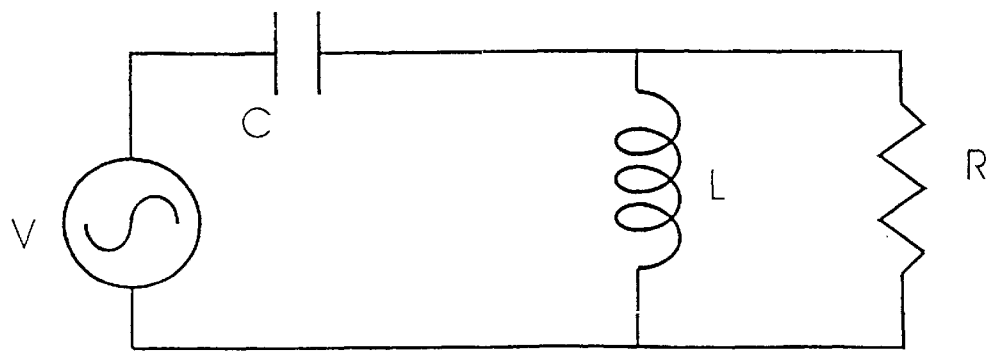
Fig. 2 (b) PRIOR ART

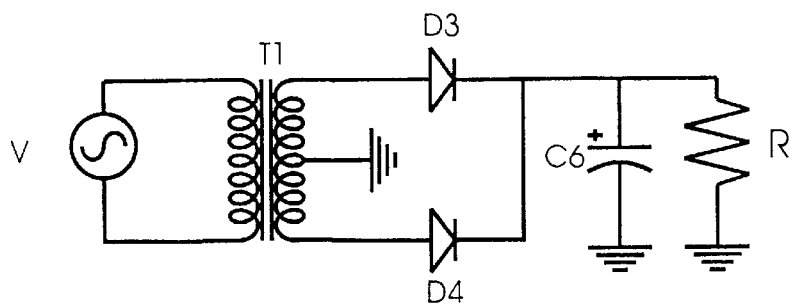
*Fig.* 8 (a)
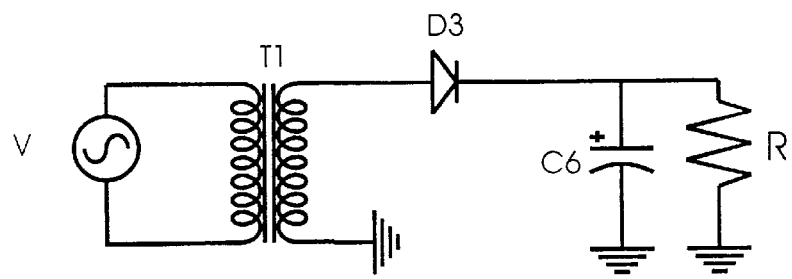
*Fig.* 8 (b)
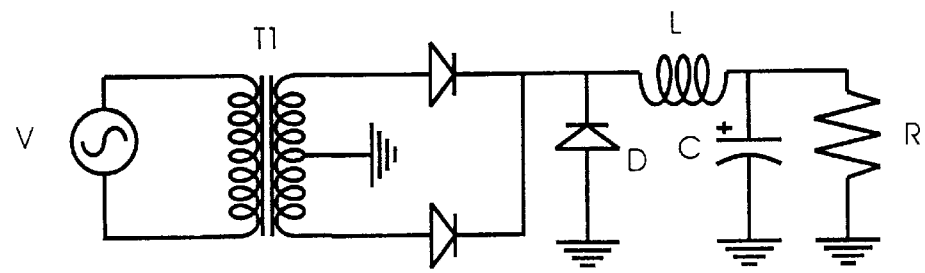
*Fig.* 9 (a)
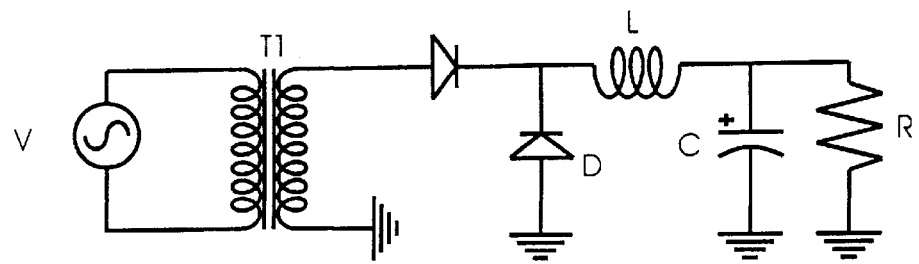
*Fig.* 9 (b)

RESONANT SWITCHING POWER SUPPLY

FIELD OF THE INVENTION

The present invention relates to a resonant switching power supply, more particularly, to a resonant switching power supply with zero voltage and zero current switch feature, whereby the power consumption is reduced and electromagnetic radiation is minimized.

BACKGROUND OF THE INVENTION

The shrinking size of electronic equipment demands increasing power density of the supplying system. The switching power supply based on the principle of pulse width modulation is better suited for efficient power control and has become more prevailing. FIGS. 1 and 2 show two types of conventional resonant switching power supplies. Those resonant switching power supplies use resonant circuits composed of inductor and capacitor to generate sinusoid wave, and the zero cross points of the sinusoid wave to provide zero-voltage switching (ZVS) or zero-current switching (ZCS). This technique can be roughly classified as serial load resonant (SLR) as shown in FIG. 1 and parallel load resonant (PLR) as shown in FIG. 2. In the above two types of circuit, the frequency of the input voltage is designed to be the same as the resonant frequency as the resonant circuit to provide the most efficient output. However, the optimal operation relies on the assumption of constant load, this is rare in practical situations.

Another conventional resonant switching power supply, is a full bridge ZVS PWM converter. The full bridge ZVS PWM converter uses four sets of switches. Therefore, the circuit is complicated and the parasitic capacitance and leak inductance is hard to manipulate, thus being difficult to mass produce. Moreover, this full bridge ZVS PWM converter is not economic in light load application, especially hard to ensure zero-voltage switching (ZVS) or zero-current switching (ZCS) in a light load application, Therefore, the present invention is intended to provide a resonant switching power supply with zero voltage and zero current switch feature, which can be operated in a half-bridge or a full-bridge scheme.

It is an object of the present invention to provide a resonant switching power supply with zero voltage and zero current switch features, whereby the power consumption is reduced and electromagnetic radiation is minimized.

It is another object of the present invention to provide a resonant switching power supply which has the advantages of low-cost and convenient manufacture and can be mass-produced to meet the requirement of various loads.

It is still another object of the present invention to provide a resonant switching power supply which will not be influenced by the parasitic capacitance and leak inductance.

The various objects and advantages of the present invention will be more readily understood from the following detailed description when read in conjunction with the appended drawing, in which:

BRIEF DESCRIPTION OF DRAWING

FIG. 1 is a circuit diagram of a conventional SLR resonant switching power supply;

FIG. 2a and 2b are circuit diagrams of a conventional PLR resonant switching power supplies;

FIG. 5a is a simplified circuit diagram of the circuit shown in FIG. 3a;

FIG. 5b shows the waveforms of switch driving voltage and resonant current in circuit of FIG. 3a;

FIG. 6 shows the voltage or current waveforms of several elements or nodes in circuit of FIG. 3a;

FIG. 7 shows the voltage or current waveforms of several elements or nodes in circuit of FIG. 3a;

FIG. 8a shows a conventional full-wave rectification output circuit of normal switching power supply;

FIG. 8b shows a conventional half-wave rectification output circuit of normal switching power supply;

FIG. 9a shows a conventional full-wave rectification output circuit of forward switching power supply;

FIG. 9b shows a conventional half-wave rectification output circuit of forward witching power supply;

DETAILED DESCRIPTION OF THE PRESENT INVENTION

Figure 3:
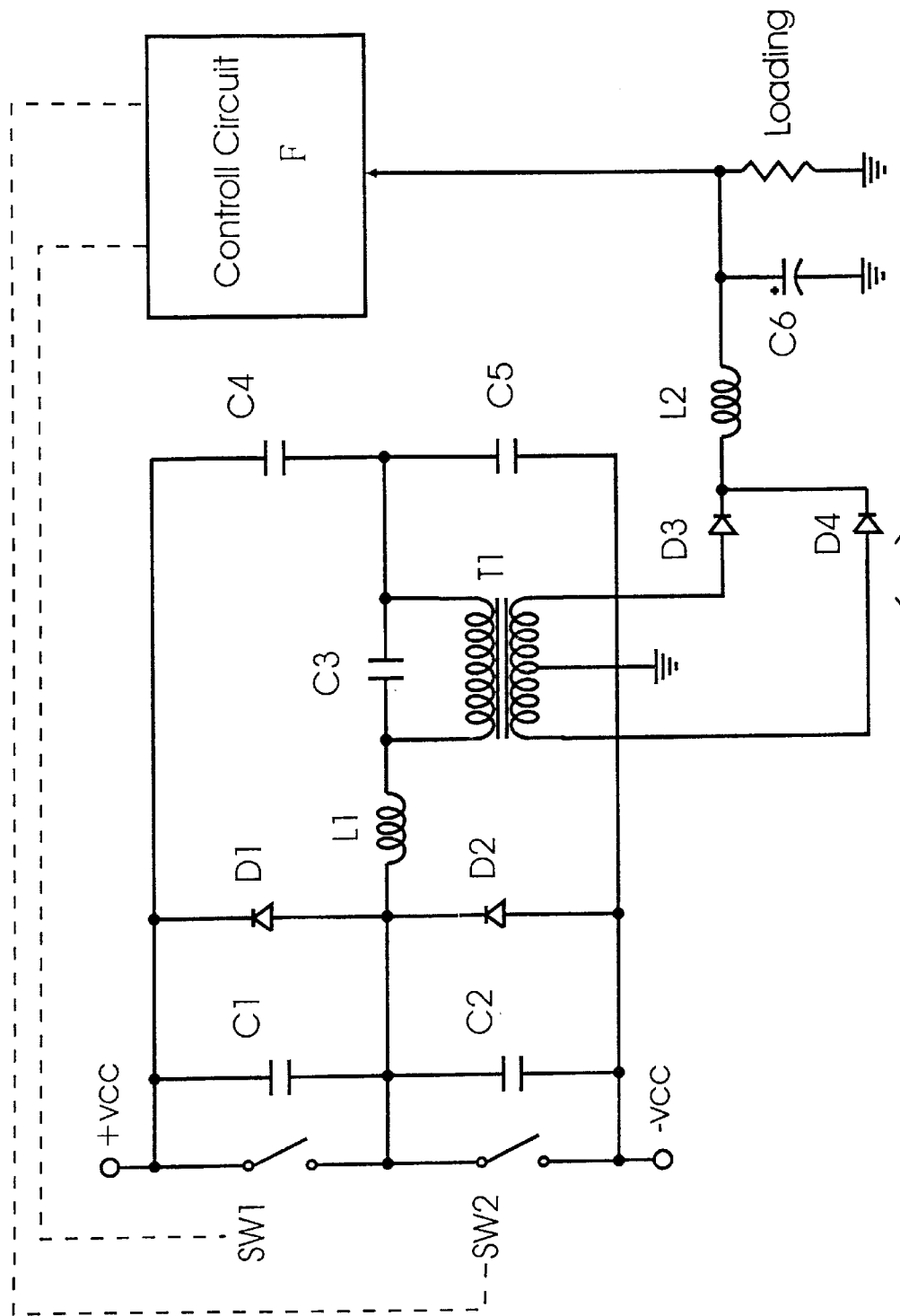
FIG. 3a shows the circuit diagram of a half-bridge resonant switching power supply according to a first preferred embodiment of the present invention.
FIG. 3b shows the circuit diagram of a full-bridge resonant switching power supply according to a first preferred embodiment of the present invention.
Figure 3:
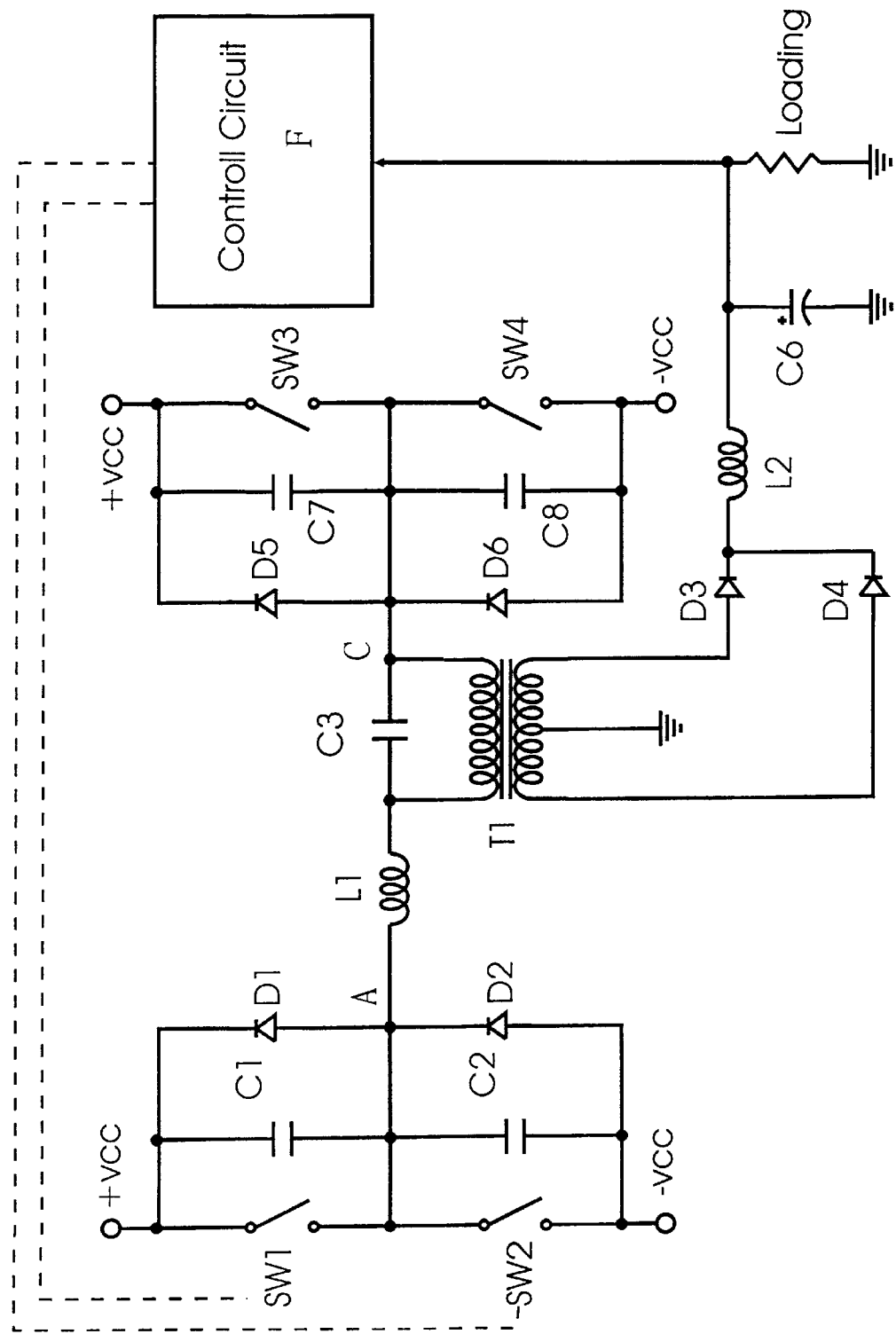

FIG. 3a shows the circuit diagram of a resonant switching power supply according to a first preferred embodiment of the present invention. It should be noted that the circuit shown in FIG. 3a is a half-bridge switching power supply; however, the principle of the present invention can also be applied to the full-bridge switching power supply as shown in FIG. 3b. As shown in this figure, the symbols SW1 and SW2 denote switching elements and can be implemented by FET, transistor or IGBT. The symbols C1 and C2 denote the parasitic capacitance of the switching elements SW1 and SW2, respectively. D1 and D2 are by-pass diodes, C3: resonant capacitor, C4 and C5: by-pass capacitors for power supply, L1: resonant inductor, T1: transformer, D3 and D4: output rectifying diode, L2: flywheel inductor for storing and removing energy, C6: output filtering capacitor and parallel with load to smooth the output voltage. Moreover, the resonant switching power supply according to the first preferred embodiment of the present invention further comprises a feedback control circuit F, which can detect the load condition and generate a control pulse to control the operation of the first switch SW1 and the second switch SW2.

Figure 5:
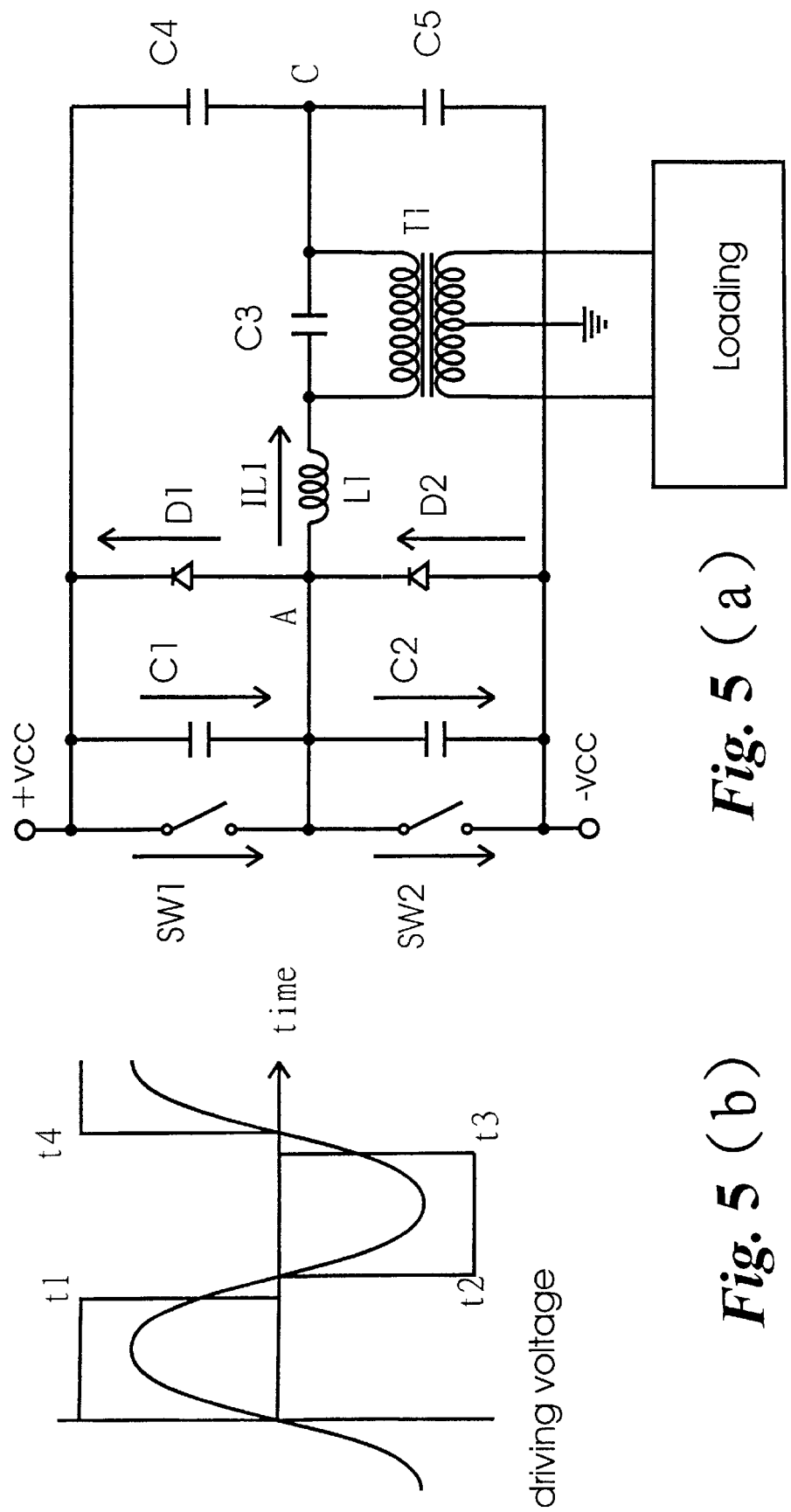
Figure 6:
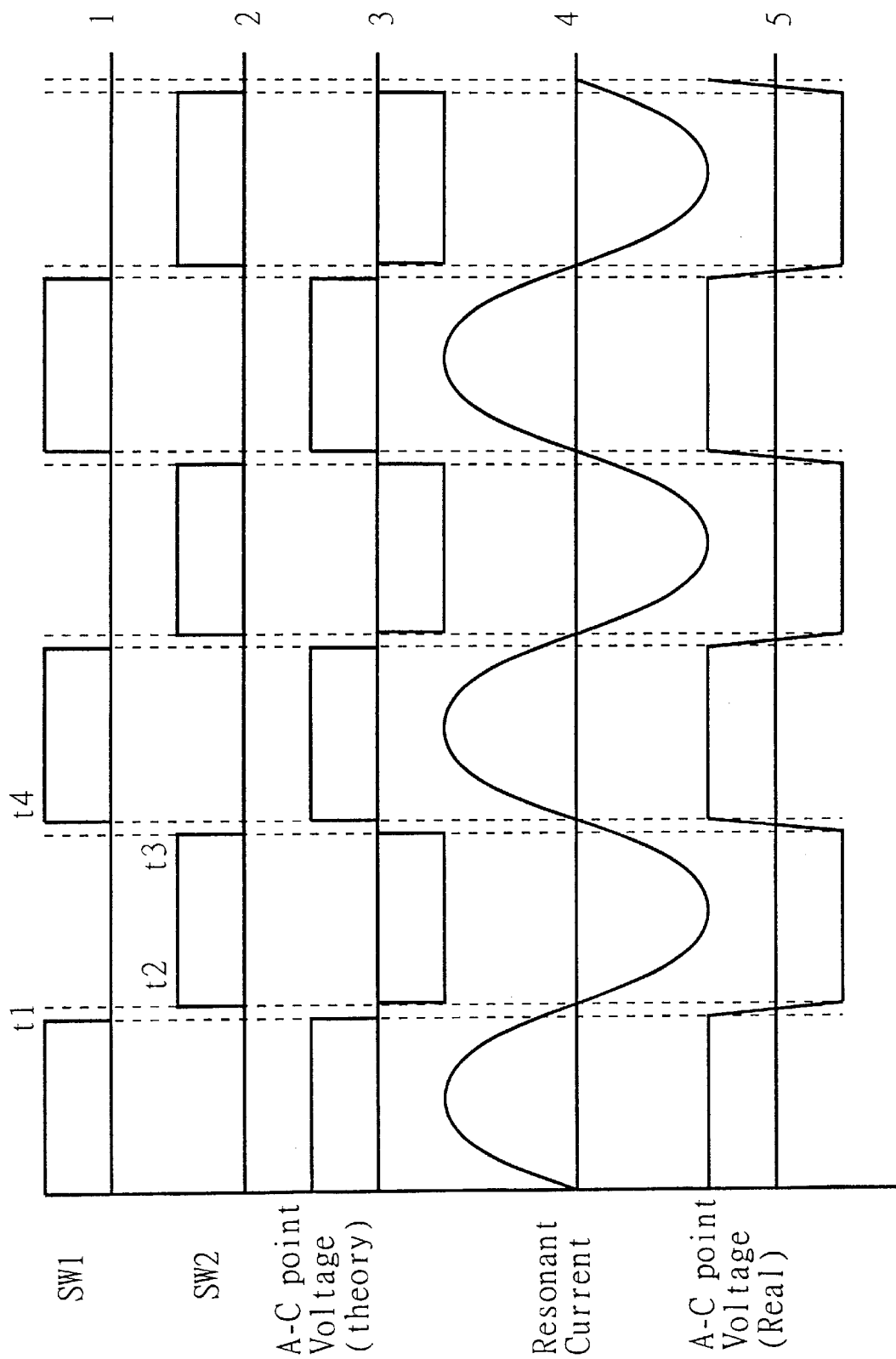
Figure 7:
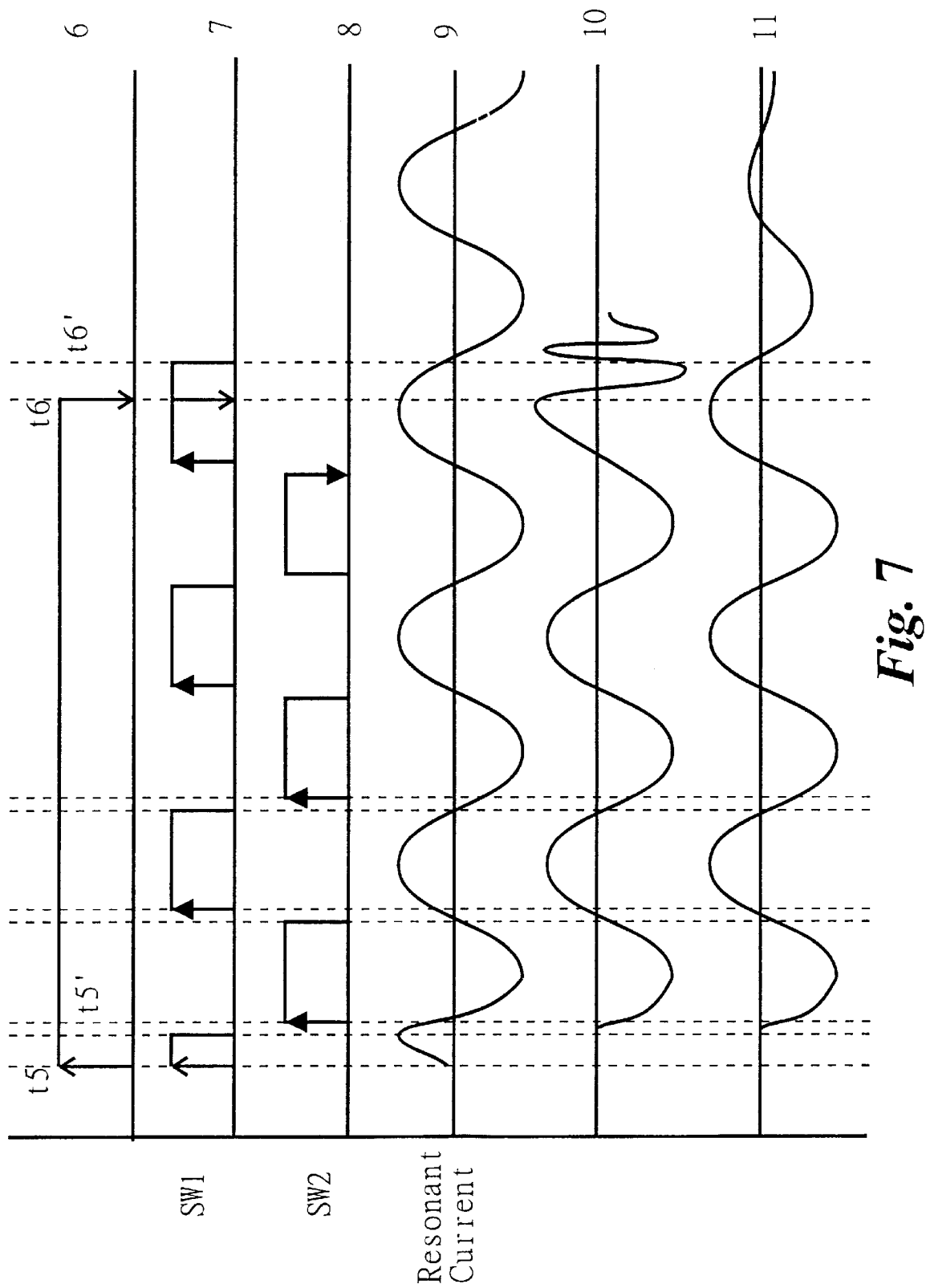

With reference to FIGS. 5 to 7, the operation principle of the resonant switching power supply according to the first preferred embodiment of the present invention is described in detail. FIG. 5a shows a simplified circuit of the circuit shown in FIG. 3a. FIG. 5b shows the waveforms of switch driving voltage and resonant current in the circuit of FIG. 3a. FIG. 6 shows the voltage or current waveforms of several elements or nodes in the circuit of FIG. 3a. FIG. 7 also shows the voltage or current waveforms of several elements or nodes in the circuit of FIG. 3a.

The first switch SW1 and the second switch SW2 have timing diagram as shown in curve 1 and 2 in FIG. 6. The theoretical value of voltage between the nodes A and C in FIG. 3a is shown in curve 3 of FIG. 6. The resonant current is shown in curve 4 of FIG. 6. On the assumption of constant load, the first switch SW1 and the second switch SW2 are square waves with duty ratio smaller than 50%. It will be explained below that the choice of duty ratio, in conjunction with the particular choice of switch driving frequency, will induce the effect of zero voltage and zero current switch. More particularly, in the resonant switching power supply shown in FIG. 3a, the frequencies of the driving pulses for the first switch SW1 and the second switch SW2 are selected to slightly deviate from the resonant frequency of the resonant frequency $\omega_0$ decided by the resonant inductor L1 and the resonant capacitor C3, and the driving pulses are continuously generated as shown in the curves 1 and 2. As shown in the curves 4 and 5 of FIG. 6, the voltage between nodes A and C (curve 5) slightly leads the resonant current (curve 4). In other words, the resonant switching power supply according to the present invention uses a switching signal with duty ratio smaller than 50% and particular selected frequency of the switching signal to induce advantageous interaction between the remaining current in the resonant circuit and the parasitic capacitance C1 and C2 of the switching elements SW1 and SW2, thus achieving zero voltage and zero current switch. This will be explained in more detail below.

With reference now to FIGS. 5a and 5b, and the reference arrow denoting the current flowing direction, FIG. 5a is the simplified circuit of that in FIG. 3a and FIG. 5b shows the voltage between nodes A and C (square wave) induced by the switching signal and the resonant current (sinusoid wave). When time approaches time t1, the resonant current $I_{L1}$ is positive, switch SW1 is shorted circuit and switch SW2 is open circuit. The voltage at node A is Vcc, the voltage across the capacitor C1 is zero and the voltage across the capacitor C2 is 2 Vcc. The diodes D1 and D2 are reverse bias and conduct no current. The current $I_{L1}$ decreases gradually. As time reached t1, the current $I_{L1}$ is near zero and the SW1 becomes open circuit. Because the current in the inductor L1 should be continuous, a certain amount of positive current still flows into the resonant circuit. At this time, the switch SW1 is nearly zero current switching. Moreover, the voltage of the switch SW1 is established by charging the parasitic capacitance C1 thereof with the infinitesimal resonant current, thus achieving zero voltage switch. As time goes by, the capacitor C1 is charged and the capacitor C2 is discharged. The voltage at node A changes from +Vcc to −Vcc rapidly and the voltage of SW2 is dropped from 2 Vcc to 0. At this time, if the switch SW2 is not turned on, an infinitesimal amount of current Id2 flows into the resonant inductor L1, wherein the diode D2 is used to protect the switch SW2. As time elapses, the resonant current becomes zero and the switch SW2 is turned on, and the resonant current $I_{L1}$ reversely flows into the switch SW2. It should be noted that the SW2 is turned on in a zero voltage and zero current switch state. This feature is symptomed by the fact that the voltage between nodes A and C (curve 5) slightly leads the resonant current (curve 6). This is also verified in the experiment conducted by the inventor.

When next switching time (t3, t4) is reached, the operation principle of the resonant switching power supply is similar to previously described. The switch SW1 replaces the role of switch SW2, C1 replaces C2, D1 replaces D2, and vice versa. Even though the frequency of the switch driving signal may have slight drift, the resonant switching power supply still has high efficiency and the diodes D1 and D2 have infinitesimal current flowing therethrough if the phase of the switch driving signal leads the phase of the resonant current. Moreover, a phase control circuit (not shown) can be incorporated into the resonant switching power supply to stabilize the frequency of the switching driving signal. Therefore, the switching time will not have error.

Moreover, the resonant switching power supply in the present invention is not sensitive to the value of parasitic capacitance and leak inductance, which hinders the conventional full bridge ZVS PWM converter. The conventional full bridge ZVS PWM converters, while switch at zero voltage, have considerable switching current. Therefore, the parasitic capacitance has rapid charging time and the discharging time of the leak inductance should be well controlled, or the performance of the conventional full bridge ZVS PWM converter is degraded. The resonant switching power supply in the present invention is operated in a zero voltage and zero current switch manner. The influence of parasitic capacitance and leak inductance is minimized.

Moreover, to overcome the problem of output voltage fluctuation caused by the load variation, a feedback control circuit F is incorporated into the resonant switching power supply in the present invention. The feedback control circuit F detects the load condition and generates a lower frequency control pulse to control the operation of the switch driving signals for the first switch SW1 and the second switch SW2. More particularly, the switch driving signals for the first switch SW1 and the second switch SW2 generally have relatively high frequency such as 100 KHz. The feedback control circuit F generates a control pulse with lower frequency, e.g. 1 KHz (as shown in the curve 6 in FIG. 7) to modulate the switch driving signals for SW1 and SW2 in response to the load condition. Therefore, the switch driving signals for the first switch SW1 and the second switch SW2 become intermittent rather than continuous. More particularly, as shown in FIG. 7, the switch driving signals for the first switch SW1 and the second switch SW2 are enabled when the control pulse (curve 6) is high, and disabled when the control pulse is low. Moreover, if the control signal is not carefully applied, the control signal will truncate the switch driving signals as indicated by the time period t5–t6. As a result, noise will be generated (as shown in the curve 10 of FIG. 7) and the efficiency of the inventive resonant switching power supply is degraded. Therefore, the control pulse according to the present invention should cover switch driving signals of integer number and does truncates the switch driving signals as indicated by the time period t5'–t6'. The resonant switching power supply generates noise-free resonant current as indicated by curve 9 of FIG. 7. The effeteness of the feedback control circuit is also experimentally validated.

Figure 10:
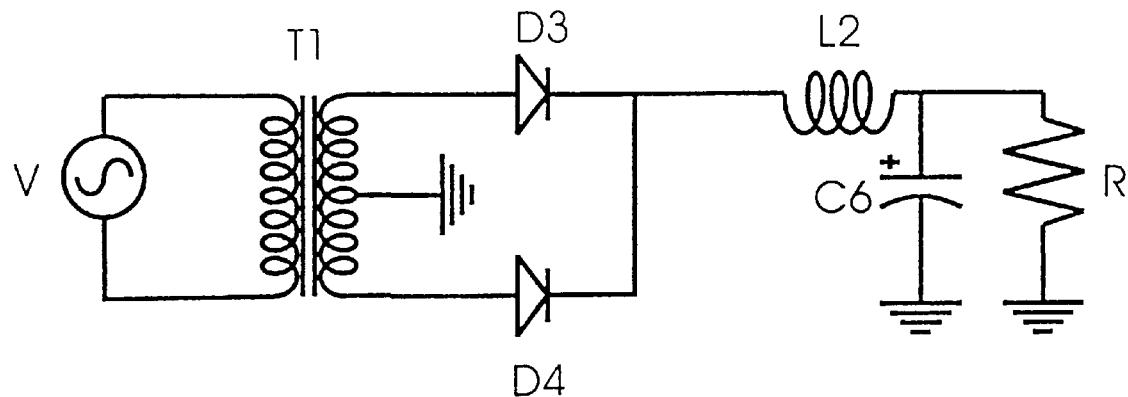
FIG. 10a shows the full-wave rectification output circuit of resonant switching power supply according to the present invention.
FIG. 10b shows the half-wave rectification output circuit of resonant switching power supply according to the present invention.
Figure 10:
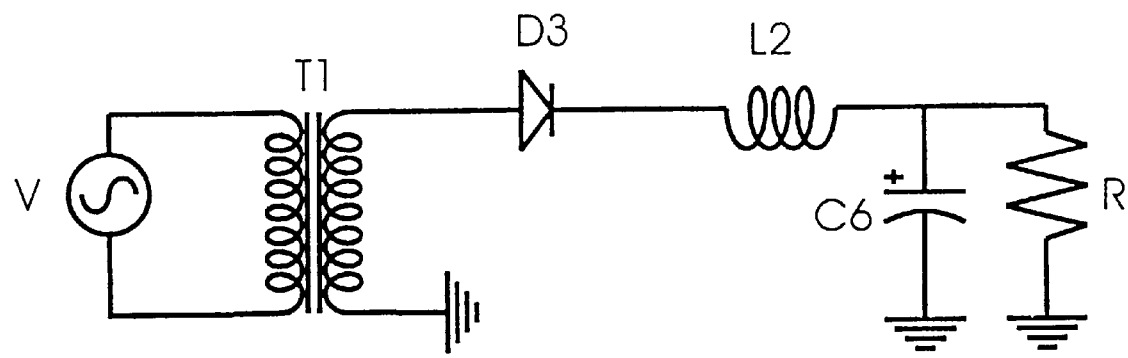

Moreover, the inventive resonant switching power supply is designed to have special output circuit. The conventional output circuit shown in FIG. 8a (for full-wave rectification circuit, the output circuit for half-wave rectification is shown in FIG. 8b) has two problems. Firstly, the diodes D3 and D4 conduct instantaneously when the output voltage of the transformer T1 exceeds the voltage Vc of the capacitor C6. The transformer T1 "see" a low output impedance instantaneously and large amount of current flows through the diodes D3 and D4. As a result, the waveform of the resonant current and resonant voltage is distorted and unwanted high-frequency noise is generated as shown in the curve 10 of the FIG. 7. Secondly, the diodes D3 and D4 are open circuit instantaneously when the output voltage of the transformer T1 is below the voltage Vc of the capacitor C6. . The transformer T1 "see" a high output impedance instantaneously, and the resonant circuit has a high Q value. In other word, the remaining current will keep oscillating within the high-Q resonant circuit such that energy is dissipated in the resonant circuit and can not output, as shown in the curve 9 of FIG. 7. As a result, the efficiency of the switching power supply is degraded, thermal energy is generated and the remaining oscillation may encounter the next switch driving pulse to generate noise. In this invention, a flywheel inductor L2 for storing and removing energy is incorporated in the output circuit as shown in FIG. 10*a* (for full-wave rectification circuit, the output circuit for half-wave rectification is shown in FIG. 10*b*). This is different to the inductor used in the forward switching power supply as shown in FIG. 9*a* (for full-wave rectification circuit, the output circuit for half-bridge is shown in FIG. 9*b*), wherein the inductor is used to isolate the output end of the transformer with the capacitor and a flywheel diode is required to remove the flywheel current of the inductor forward current. On the contrary, the flywheel inductor L2 shown in FIG. 10*a* does not require a flywheel diode to conduct the remaining current in the resonant circuit. The forward flywheel current will conduct the remaining current of the resonant circuit to the capacitor such that the remaining current in the resonant circuit is rapidly diminished as shown in the curve 11 of FIG. 7.

Figure 4:
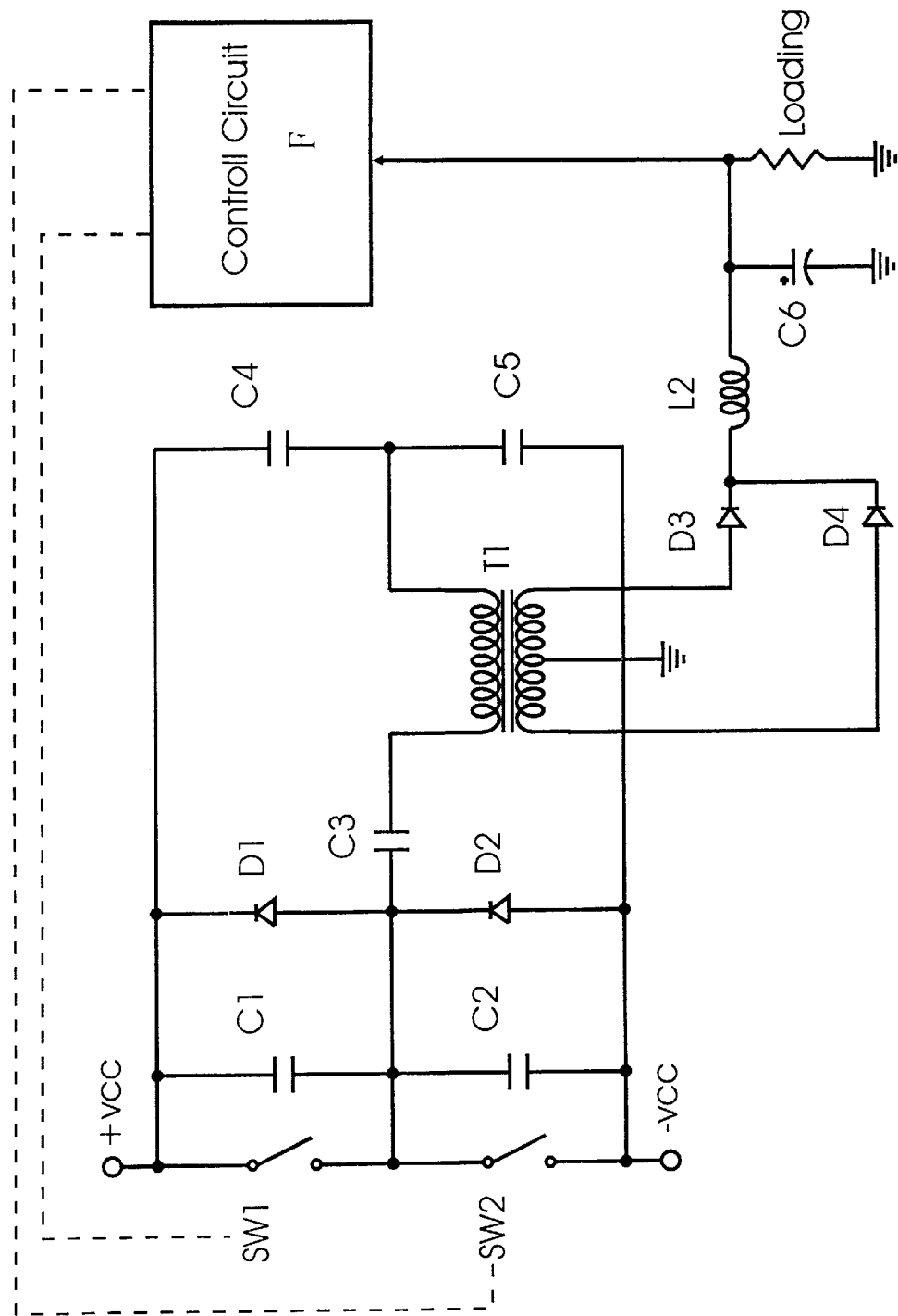
FIG. 4a shows the circuit diagram of a half-bridge resonant switching power supply according to a second preferred embodiment of the present invention.
FIG. 4b shows the circuit diagram of a full-bridge resonant switching power supply according to a second preferred embodiment of the present invention.
Figure 4:
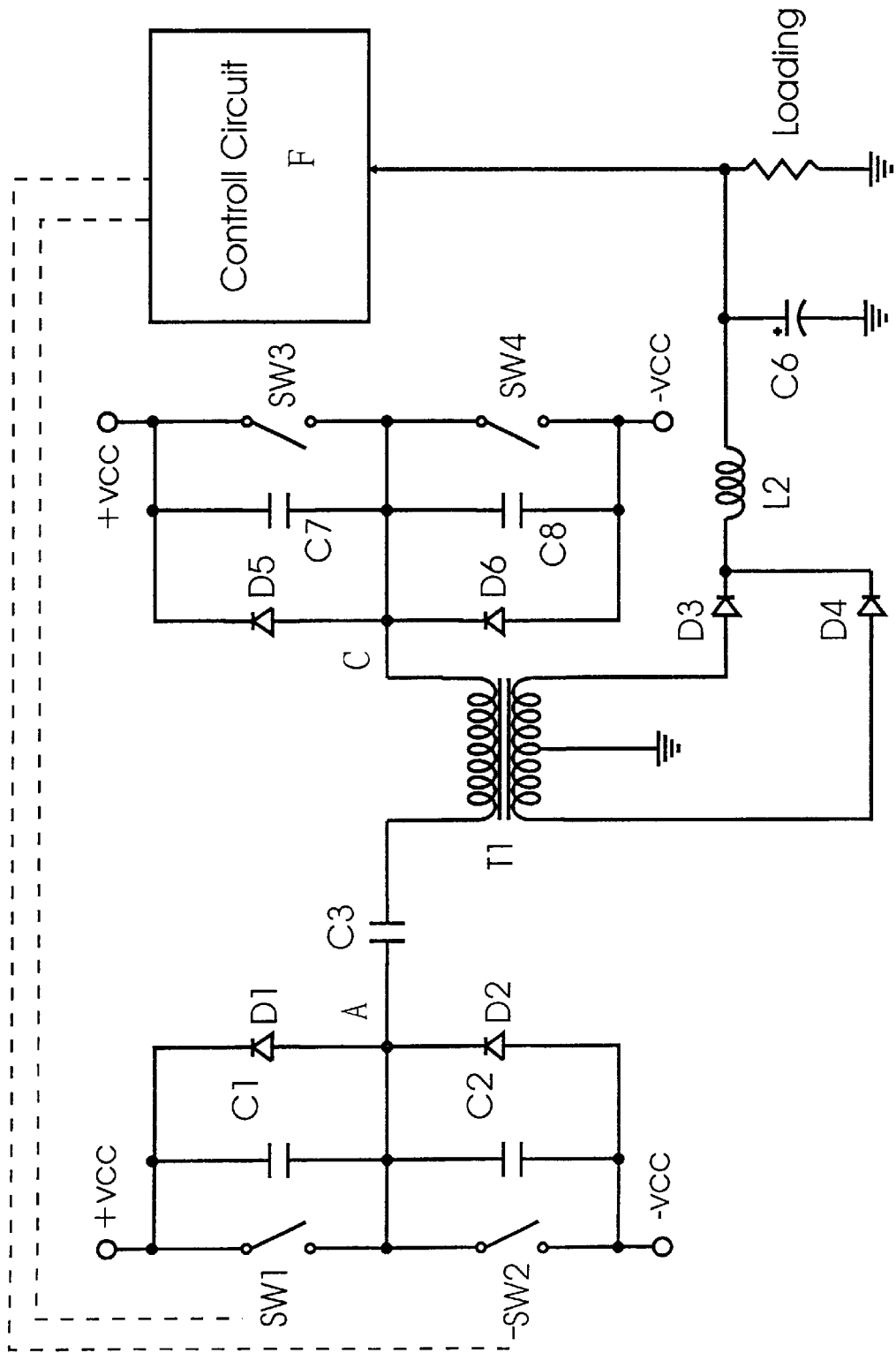

FIG. 4*a* shows the circuit diagram of a resonant switching power supply according to second preferred embodiment of the present invention. It should be noted that the circuit shown in FIG. 4*a* is a half-bridge switching power supply, however, the principle of the present invention can also be applied to the full-bridge switching power supply as shown in FIG. 4*b*. The resonant switching power supply shown in FIG. 4*a* is similar to that shown in FIG. 3*a* except that the transformer T1 replaces the function of the resonant inductor L1, i.e., the resonant inductor L1 is eliminated to save cost. The switching power supply shown in FIG. 4*a* still has high efficiency if the frequency of the switch driving signal is selected to enable the phase of the switch driving signal lead the phase of the resonant current. Moreover, switching signal has duty ratio smaller than 50% to induce advantageous interaction between the remaining current in the resonant circuit and the parasitic capacitance C1 and C2 of the switching elements SW1 and SW2, thus achieving zero voltage and zero current switch.

From above description, the present invention provides a resonant switching power supply with high efficiency and low electromagnetic radiation. The inventive resonant switching power supply is insensitive to the parasitic capacitance and leak inductance, thus eliminating complicated calibration process. The feedback control circuit can be easily implemented by simple digital circuit to reduce noise due to fluctuate load. The zero voltage and zero current switch feature can be realized by engineer the operation frequency of the switch driving signal to deviate form the resonant frequency such that the phase of the switch driving signal leads the resonant current. Moreover, the inventive resonant switching power supply has simple circuit and can be easily adapted to use in half-bridge circuit or full-bridge circuit.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A resonant switching power supply for supplying power to a load, comprising a switching module having four sets of switching elements and each having a corresponding switch driving circuits; said switch driving circuit generating switching pulse to control the on and off of said switching elements for full bridge switching operation;

a resonant circuit;

a transformer connected to said resonant circuit and connected to said load through a rectifying circuit;

a feedback control circuit connected between said load and said switch driving circuits, said feedback control circuit sensing the load condition of said load and generating a corresponding control pulse to enable or disable said switch driving circuits;

said resonant switching power supply being characterized in that said switching elements being charged or discharged through the parasitic capacitance thereof during switching such that the voltage across said switching elements change slowly;

said switch driving circuits generating driving pulses to switch said switching elements; the frequency of said driving pulses deviating from the resonant frequency of said resonant circuit such that the phase of said driving pulses lead the resonant current of said resonant circuit;

said control pulse being such synchronized that said control pulse encloses complete and integral-number driving pulses of said switch driving circuits.

2. The resonant switching power supply as in claim 1, wherein said switching elements are implemented by MOSFET, transistor, or IGBT.

3. The resonant switching power supply as in claim 1, wherein each said switching element has a by-pass diode connected in parallel with said switching element.

4. The resonant switching power supply as in claim 1, further comprises a flywheel inductor connected between said rectifying circuit and said load.

5. The resonant switching power supply as in claim 1, wherein said resonant circuit comprises a resonant inductor and a resonant capacitor.

6. The resonant switching power supply as in claim 1, wherein said resonant circuit comprises a resonant capacitor in conjunction with the inductor of said transformer.

7. The resonant switching power supply as in claim 1, wherein said switching pulse are square pulse with duty ratio smaller than 50%.

8. The resonant switching power supply as in claim 1, further comprises a phase control circuit to ensure that the phase of said driving pulses lead the resonant current of said resonant circuit.

9. A resonant switching power supply for supplying power to a load, comprising a switching module having two sets of switching elements and each having a corresponding switch driving circuits; said switch driving circuit generating switching pulse to control the on and off of said switching elements for half bridge switching operation;

a resonant circuit;

a transformer connected to said resonant circuit and connected to said load through a rectifying circuit;

a feedback control circuit connected between said load and said switch driving circuits, said feedback control circuit sensing the load condition of said load and generating a corresponding control pulse to enable or disable said switch driving circuits;

said resonant switching power supply being characterized in that said switching elements being charged or discharged through the parasitic capacitance thereof during switching such that the voltage across said switching elements change slowly;

said switch driving circuits generating driving pulses to switch said switching elements; the frequency of said driving pulses deviating from the resonant frequency of said resonant circuit such that the phase of said driving pulses lead the resonant current of said resonant circuit;

said control pulse being such synchronized that said control pulse encloses complete and integral-number driving pulses of said switch driving circuits.

10. The resonant switching power supply as in claim 9, wherein said switching elements are implemented by MOSFET, transistor, or IGBT.

11. The resonant switching power supply as in claim 9, wherein each said switching element has a by-pass diode connected in parallel with said switching element.

12. The resonant switching power supply as in claim 9, further comprises a flywheel inductor connected between said rectifying circuit and said load.

13. The resonant switching power supply as in claim 9, wherein said resonant circuit comprises a resonant inductor and a resonant capacitor.

14. The resonant switching power supply as in claim 9, wherein said resonant circuit comprises a resonant capacitor in conjunction with the inductor of said transformer.

15. The resonant switching power supply as in claim 9, wherein said switching pulse are square pulse with duty ratio smaller than 50%.

16. The resonant switching power supply as in claim 9, further comprises a phase control circuit to ensure that the phase of said driving pulses lead the resonant current of said resonant circuit.

* * * * *